United States Patent
Miyata

(10) Patent No.: US 9,328,215 B2
(45) Date of Patent: May 3, 2016

(54) DYEABLE RESIN COMPOSITION

(71) Applicant: Kabushiki Kaisha Kaisui Kagaku Kenkyujo, Fukuoka-ken (JP)

(72) Inventor: Shigeo Miyata, Fukuoka-ken (JP)

(73) Assignee: KABUSHIKI KAISHA KAISUI KAGAKU KENKYUJO, Fukuoka-ken (JP)

(*) Notice: Subject to any disclaimer, the term of this patent is extended or adjusted under 35 U.S.C. 154(b) by 0 days.

(21) Appl. No.: 14/464,108

(22) Filed: Aug. 20, 2014

(65) Prior Publication Data

US 2016/0053074 A1 Feb. 25, 2016

(51) Int. Cl.

| | | |
|---|---|---|
| C08K 9/10 | (2006.01) | |
| C09K 9/00 | (2006.01) | |
| D06P 1/00 | (2006.01) | |
| D06P 3/00 | (2006.01) | |
| C08K 3/26 | (2006.01) | |
| D01F 6/06 | (2006.01) | |
| D01F 6/70 | (2006.01) | |

(52) U.S. Cl.
CPC ... C08K 3/26 (2013.01); D01F 6/06 (2013.01); D01F 6/70 (2013.01); C08K 2003/267 (2013.01)

(58) Field of Classification Search
CPC .............................. C08K 3/26; C08K 2003/267
See application file for complete search history.

(56) References Cited

U.S. PATENT DOCUMENTS

| | | | | | |
|---|---|---|---|---|---|
| 5,456,960 A | * | 10/1995 | Ido | ...................... | D06P 1/65118 428/206 |
| 2005/0038138 A1 | * | 2/2005 | Hutte | ...................... | D01F 6/70 523/210 |

FOREIGN PATENT DOCUMENTS

| | | | | | |
|---|---|---|---|---|---|
| JP | 2000-119510 | * | 4/2000 | ............. | C08L 75/04 |
| JP | 2007-303025 | * | 11/2007 | ................ | D01F 6/94 |
| JP | 2008-163491 | * | 7/2008 | ................ | D01F 1/10 |

* cited by examiner

*Primary Examiner* — Robert Harlan

(74) *Attorney, Agent, or Firm* — Wenderoth, Lind & Ponack, L.L.P.

(57) ABSTRACT

The invention provides a resin composition whose dyeability is improved. The composition comprises a resin, and a hydrotalcite type material in an amount of 0.1 to 30 parts relative to 100 parts of the resin, wherein the hydrotalcite type material is represented by formula (1):

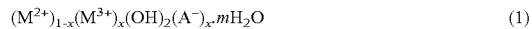

$$(M^{2+})_{1-x}(M^{3+})_x(OH)_2(A^-)_x \cdot mH_2O \qquad (1)$$

wherein $M^{2+}$ is at least one species of divalent metal ions, $M^{3+}$ is at least one species of trivalent metal ions, A– is at least one species of alkylbenzenesulfonic acid ions with the alkyl group having at least 8 carbon atoms, x is the number satisfying the inequality: $0<x<0.5$, and m is the number satisfying the equality: $0<=m<5$.

9 Claims, No Drawings

DYEABLE RESIN COMPOSITION

TECHNICAL FIELD OF THE INVENTION

The present invention relates to a dyeable resin composition such as a dyeable resin fiber composition, more specifically a dyeable resin composition which comprises a resin which is difficult to dye and a specific hydrotalcite type material. The present invention relates also to a method to prevent a dye from leaving from a dyed resin composition in washing to thereby improve color fastness of the dyed resin composition

BACKGROUND OF THE INVENTION

Polyolefin resins such as polyethylene and polypropylene are non-polar and have no polar group to which a dye can bonds. Accordingly, they cannot be dyed. It has been desired to make such polymers dyeable, since such polymers were developed.

Conventionally, a pigment is added to such polymers before shaping, such as spinning, to give color to the polymers. This method lacks such flexibility as to adapt coloring to catch up with the change of needs in the market. Variety of colors are less, compared to dyeing with dyes. For these reasons, applications of polyolefin resins, such as polypropylene fiber, are limited, compared to dyeable resins.

Some fibers such as polyurethane fiber are dyeable, but their dyabilities are relatively low. Polyurethane fiber is usually used in a blend with nylon or polyester. Then, uneven color occurs between the polyurethane fiber and nylon or polyester fiber, which decreases a commercial value of the product In order to solve the aforesaid problems in dyeablity of such resins or fibers, the present inventor invented the technology where hydrotalcite type material is added to a resin, melt mixed, shaped, e.g., spun, and then dyed with anionic dyes i.e., acidic dyes, taking advantage of the anion-exchanging ability of hydrotalcite type material. The technology is disclosed in the following three literatures.

Japanese Patent Application Laid-Open No. 2000-119510 discloses a composition having good dyeablity, and comprising polyurethane and 0.1 to 20% by weight of a hydrotalcite type material in which intercalating anions are mono_ or di_valent anions such as $NO_3^-$, $Cl^-$, $Br^-$, $ClO_4^-$, $HCOO^-$, $CH_3COO^-$ and $SO_4^{2-}$.

Japanese Patent Application Laid-Open No. 2007-303025 discloses an elastic polyurethane fiber composition comprising polyurethane and 0.1 to 20% by weight of a hydrotalcite type material in which intercalating anions are ions of a carboxylic acid having an aromatic group or ions of an aromatic aminesulfonic acid.

Japanese Patent Application Laid-Open No. 2008-163491 discloses a fiber composition comprising 0.1 to 20% by weight of a hydrotalcite type material in which intercalating anions are ions of a $C_{10-25}$ higher aliphatic acid.

PRIOR LITERATURES

Patent Publications

[Literature 1] Japanese Patent Application Laid-Open No. 2000-119510
[Literature 2] Japanese Patent Application Laid-Open No. 2007-303025
[Literature 3] Japanese Patent Application Laid-Open No. 2008-163491

SUMMARY OF THE INVENTION

The diameter of the ions is large in the order of the aforesaid Literature 1, Literature 2 and Literature 3, and dyeablity is better correspondingly in this order. Dyeing with blue dyes which is previously difficult is made possible in Literature 3. Thus, all colors can be attained in dyeing.

However, in overviewing all dyeing processes, it was found that a dry spinning step of polypropylene or the like requires a spinning temperature of approximately 280 to 300 degrees C. in order to secure economical productivity; and a part of the intercalating ions of the a $C_{10-25}$ higher aliphatic acid decompose at these temperatures.

Therefore, one of the purposes to be attained by the invention is to provide a dyeable resin composition, particularly a dyeable fiber composition, which is dyeable in all colors including a blue color and which is stable at a temperature above 300 degrees C.

A second purpose is to improve color fastness, that is, to prevent a dye from leaving the dyed material into water or organic solvents such as tetrachloroethylene used in dry cleaning.

The present invention provides a dyeable resin composition, comprising a resin, and a hydrotalcite type material in an amount of 0.1 to 30 parts relative to 100 parts of the resin, wherein the hydrotalcite type material is represented by formula (1):

$$(M^{2+})_{1-x}(M^{3+})_x(OH)_2(A^-)_x \cdot mH_2O \tag{1}$$

wherein $M^{2+}$ is at least one species of divalent metal ions, $M^{3+}$ is at least one species of trivalent metal ions, A– is at least one species of alkylbenzenesulfonic acid ions with the alkyl group having at least 8 carbon atoms, x is the number satisfying the inequality: $0<x<0.5$, and m is the number satisfying the equality: $0<=m<5$.

A second aspect of the invention provides a method of improving color fastness of a dyed resin composition obtained by dyeing the dyeable resin composition according to any one of claims 1 to 5 with an anionic dye, wherein the dyed resin composition is surface treated with a solution of at least one polymeric polyanions, optionally followed by treatment with a solution of pylyvalent metal ions.

DETAILED DESCRIPTION OF THE INVENTION

On account of the invention, heat stability of the dyeablity is raised up to approximately 300 degrees C. so that a problem in a spinning step is solved, and color fastness is improved so that almost no dye leaves a dyed material into water or organic solvents in washing. Further, the present dyeable resin composition where the intercalating anions are sulfonic acid ions is more hydrophilic and, therefore, better dyeable, compared to the fiber composition of Literature 3 where the intercalating anions are higher aliphatic acid ions.

EMBODIMENTS OF THE INVENTION

The intercalating anion A– in the hydrotalcite type material represented by formula (1) is an ion of alkylbenzene sulfonic acid, whereby the interlayer distance in the hydrotalcite type material is made at least similar to a size of a dye, which distance is necessary for good dyeability, and heat stability is raised by approximately 50 degrees C., compared to the case of the higher aliphatic acid whose heat stability is less. There are a linear type (soft type) of ions of alkylbenzene sulfonic acid and a branched type of ions of alkylbenzene sulfonic acid. The linear type (soft type) of ions of alkylbenzene sulfonic acid is preferred because it may widen the interlayer distance with a fewer number of carbon atoms, and is more hydrophilic (providing better accessibility for a dye), compared to the branched type having the same number of carbon atoms. The number of carbon atoms in the alkyl moiety is preferably 8 or more, more preferably 10 to 14. This is because a larger number of carbon atoms give a larger interlayer distance so that anionic dyes may enter easier into a gap between layers, while a larger number of carbon atoms make hydrophilicity worse; therefore, there is an optimal range in the number of carbon atoms to balance these contradictory actions.

The anion is preferably linear decylbenzensulfonic acid ion (n-$C_{10}H_{21}C_6H_4SO_3^-$), linear undecylbenzensulfonic acid ion (n-$C_{11}H_{23}C_6H_4SO_3^-$), linear dodecylbenzensulfonic acid ion (n-$C_{12}H_{25}C_6H_4SO_3^-$), linear tridecylbenzensulfonic acid ion (n-$C_{13}H_{27}C_6H_4SO_3^-$), and linear teradecylbenzensulfonic acid ion (n-$C_{14}H_{29}C_6H_4SO_3^-$).

Blue dyes, with which dyeing is most difficult, have an ion diameter of approximately 20 Angstroms. For easier dyeing with blue dyes, the strongest peak angle in X ray diffraction of the hydrotalcite type material is preferably approximately at least 25 Angstroms. The strongest peak angle in X ray diffraction corresponds to a unit layer thickness of 25 Angstroms (that is, approximately 4.7 Angstroms of a basic layer thickness, and approximately 20 Angstroms of an intermediate layer thickness where anions enter, wherein the basic layer is an octahedron layer composed of hydroxides of $M^{2+}$ and $M^{3+}$). The hydrotalcite type material with aromatic aminesulfonic acid ions as the intercalating ions, proposed in Literature 2, has a unit layer thickness much less than 25 Angstroms, so that it has poor dyeability, particularly with blue dyes.

Besides $A^-$ in formula (1), the hydrotalcite type material represented by formula (1) may contain a small amount of other anions as impurity originating from starting materials or from the atmosphere, such as $SO_4^{2-}$, $NO_3^-$, $Cl^-$, and $CO_3^{2-}$, though their amount is preferably as small as possible, such as, for instance, at most 20 mol %, more preferably at most 10 mol %, further preferably at most 5 mol %, of the whole intercalating ions.

$M^{2+}$ in formula (1) may be divalent ions of Mg, Ni, Zn, Cu and Co. Mg and/or Zn is preferred for whiteness, low toxicity and costs. $M^{3+}$ may be trivalent ions of Al, Fe, Ga, In and Co. Al is most preferred with the same reasons for $M^{2+}$.

The symbol "x" in formula (1) may be in the wide range, $0<x<0.5$. The amount of the intercalating anions increases with the increasing value of x up to 0.4. The value 0.4 corresponds to the largest possible amount of $M^{3+}$ capable of substituting $M^{2+}$ of $M^{2+}(OH)_2$, where the amount of the intercalating ions is maximum. Therefore, a preferred rang of x is $0.25<=x<=0.4$.

The hydrotalcite type material represented by formula (1) is preferably well dispersible in the resin. To this end, secondary particles have an average diameter of 2 micron meters or less, particularly 1.0 micron meter or less, and a BET specific area of at most 30 $m^2/g$, particularly at most 20 $m^2/g$.

The amount of the hydrotalcite type material is preferably 0.1 to 30% by weight, more preferably 1 to 20% by weight, particularly 5 to 15% by weight, on the basis of the resin. In order to have good spinning workability, it is preferred that the hydrotalcite type material is mixed with the resin in amount of 20 to 50% by weight relative to the resin to form a master batch, which is then mixed with a neat resin.

The present invention further provides a method for preventing an anion dye (acidic dye) from leaving the dyed resin into water or organic solvents during washing. The method comprise the following step (A), optionally followed by step (B).

(A) A dyed resin, such as fiber, is surface treated with a solution of a polymeric polyanion selected from the group consisting of polyphosphoric acid, such as tetrapolyphosphoric acid, hexamethaphosphoric acid, and acidic hexametha phosphoric acid, and alkali metal or ammonium salts thereof; carboxymethyl cellulose and alginic acid, and alkali metal or ammonium salts thereof; olefin-maleic acid copolymers, beta-naphtalenesulfonic acid-formalin condensates, polycarboxylic acids, and partial alkyl esters of polycarboxylic acids, and alkali metal or ammonium salts thereof and, then, (B) optionally treated with a solution of polyvalent ions of metal such as Ca, Mg, Zn and Al to react with the polymeric polyanion to thereby form a hardly-soluble membrane.

The amount of the polymeric polyanion is preferably 0.01 to 20% by weight, more preferably 0.1 to 10% by weight, relative to the hydrotalcite type material. The amount of the polyvalent metal ions is 1 to 100% by weight, as calculated as metal, relative to the amount of the polymeric polyanion.

It is necessary that the polymeric polyanion is larger than an interlayer distance between the layers of the hydrotalcite type material to which the dye intercalates, and is preferably of approximately 30 Angstroms or larger, more preferably approximately 50 Angstroms or larger. The polymeric polyanion with such a size is little ion-exchanged with the dye. A solvent for the solution of the polymeric polyanion is not restricted to a particular one, but is preferably water. A temperature for the surface treatment is not restricted to a particular one, but is preferably 40 to 90 degrees C.

Crystal surface of the hydrotalcite type material, which surface has a charge of plus, is covered with the polymeric polyanion. Even this alone can work to prevent the intercalating anions from leaving into a solvent. In addition, the polyvalent metal anions which are added subsequently react with a part of the anions of the polyanion to form a hardly soluble membrane so as to further strongly prevent the intercalating anions from leaving into a solvent.

The preparation of a hydrotalcite type material is publicly known. In the present invention, for instance, an aqueous solution of a water-soluble salt of $M^{2+}$ and a water-soluble salt of $M^{3+}$ is mixed under stirring with an alkaline aqueous solution of an alkali metal hydroxide, such as sodium hydroxide, and/or an alkali metal carbonate, such as sodium carbonate, while maintaining the pH at 8 or higher, preferably 9 to 11, to cause co-precipitation, and subsequently washed with an aqueous solution of alkali metal carbonate and then with water to obtain a $CO_3^{2-}$ type of hydrotalcite type material, where $CO_3^{2-}$ is intercalating anions. This is then subjected to hydrothermal treatment in an autoclave at 100 degrees C. or higher, preferably 120 to 200 degrees C., preferably for 10 hours or more, to promote crystallization and to decrease aggregation. Then, this is treated with a monovalent acid, such as nitric acid and hydrochloric acid, to ion-exchange $CO_3^{2-}$ with $NO_3^-$ or $Cl^-$, followed by ion-exchange using an aqueous solution of an alkali metal salt of alkylbenzene-sulfonic acid to obtain the desired hydrotalcite type material represented by formula (1).

The aforesaid two ion exchange steps are conducted preferably with an amount of the anions of 0.8 to 1.5 equivalents, more preferably 0.9 to 1.2 equivalents, relative to the amount of the intercalating anions. The final ion exchange is preferably followed by water washing, drying, crushing and/or classification.

The resin in the invention may be any type of resin, such as polyacrylate, polyacetate, nylon, polyvinylidene, vinylon, polyacetal, polyurethane, polyester, polyethylene, polyvinyl chloride, polyvinyl pyrrolidon, and polypropylene. The resin is preferably polypropylene, polyethylene, and elastic polyurethane.

The dyeable resin composition in the invention may be in a form of dyeable fiber compositions.

The present fiber may be prepared by spinning the present dyeable resin composition into fiber. The spinning step may be of any known types, such as dry, wet or melt spinning. In the case of dry or melt spinning, it is preferred that the resin and approximately 10 to 50% by weight, relative to the resin, of the hydrotalcite type material are melt mixed to prepare a master batch, which is then mixed with the remaining amount of the resin to prepare a feed to be spun.

A dyeing method may be any conventional method known for dyeing with a dye. In the case of fiber, any known method for dyeing synthetic fibers or natural fibers may be used, such as pad-steam methods, pad-thermofix methods, dip-dyeing methods, printing methods and spray dyeing methods. A dyeing machine may be any conventional one, such as jet dyeing machines, wince dyeing machines, and air flow dyeing machines.

EXAMPLES

The present invention will be explained with reference to the following non-restrictive Examples.

The measurement methods are as described below.

(1) Thickness of a Unit Layer of the Hydrotalcite Type Material

An X-ray diffraction pattern is obtained by powder X-ray diffraction, and the thickness is obtained by the Bragg's law from a position of a strongest peak at a lowest angle side.

(2) BET Specific Surface Area

Determined by liquid nitrogen adsorption at −196 degrees C. according to the BET method.

(3) Particle Size Distribution

Sample powder is put in ethanol, and sonicated for 5 minutes. Size distribution of secondary particles in ethanol is determined by a laser diffraction method.

(4) Dyeability

Dyed pellets are pressed into a sheet of a thickness of 1 mm at 195 degrees C. by a press machine. An absorbance of the sheet is determined at a wave length of 615 nm by a spectrophotometer.

(5) Color Fastness

Two grams of the dyed pellets are put in a test tube, to which 10 ml of deionized water or tetrachloroethylene is added, left standing still at approximately 30 degrees C. for 20 hours. Then, an absorbance of the deionized water or tetrachloroethylene is determined at a wave length of 615 nm by a spectrophotometer. A concentration of a blue dye in ppm is determined using a calibration curve of absorbance vs. ppm.

(6) Heat Stability of the Hydrotalcite Type Material

DTA-TGA is measured on hydrotalcite type material powder. A weight loss in percent from 200 degrees C. to 300 degrees C. is determined. It is noted that a weight loss below 200 degrees C. is small and, on the other hand, materials volatile above 200 degrees C. are an obstacle in a shaping step such as spinning by causing bubbles, and therefore, a weight loss from 200 degrees C. to 300 degrees C. is determined.

Example 1

Synthesis of a Hydrotalcite Type Material with Intercalating Ions being Dodecylbenzenesulfonic Acid Ions 200 Grams of hydrotalcite of a $CO_3$ type, with a BET specific surface area of 12 $m^2/g$, an average secondary particle diameter of 0.46 micron m, and chemical composition of $Mg_{0.68}Al_{0.32}(OH)_2$ $(CO_3)_{0.16} \cdot 0.5H_2O$, were added to approximately 2 liters of warm water of approximately 70 degrees C., to which 1.9 liters of a aqueous nitric acid solution of a concentration of 0.5 mol/l were added under stirring, while maintaining a pH in a range of approximately 3 to 4, to thereby ion-exchange $CO_3^{2-}$ with $NO_3^-$. 256 Grams of linear type alkylbenzenesulfonic acid containing 96.7 wt % of linear dodecylbenzenesulfonic acid, nearly equivalent to the amount of $NO_3$, Soft Ohsen 5S ex Nippon Oils & Fats, was dissolved in water and neutralized with sodium hydroxide to a pH of approximately 7 to obtain an aqueous solution of approximately 2 liters, which was then added to the aforesaid $NO_3$ type hydrotalcite and subjected to ion exchange with stirring at approximately 80 degrees C. for approximately 30 minutes, followed by filtration in reduced pressure, washing with water, drying at approximately 120 degrees C., and crushing.

The obtained powder was subjected to X ray diffraction. Diffractions attributable to hydrotalcite only were observed. The strongest diffraction peak was at approximately 30.4 Angstroms, which corresponds to a thickness of a unit layer of the hydrotalcite. The X ray diffraction pattern had almost no strongest diffraction peak for hydrotalcite of $NO_3$ type (d=approximately 8.9 Angstroms) or $CO_3$ type (d=approximately 7.6 Angstroms). Chemical composition was determined by chemical analysis, total organic carbon analysis, and thermal analysis (DTA, TGA) to quantify the amount of water present between layers. The chemical composition was as follows.

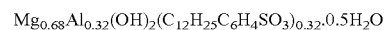

$Mg_{0.68}Al_{0.32}(OH)_2(C_{12}H_{25}C_6H_4SO_3)_{0.32} \cdot 0.5H_2O$

Heat stability determined by the thermal analysis is as shown in Table 1.

This material had a specific BET surface area of 17 $m^2/g$; an average secondary particle diameter of 0.66 micron meter; and a maximum secondary particle diameter of 1.1 micron meters.

Dyeing

The material obtained above was dried at 120 degrees C. for 2 hours in a dryer. Polypropylene having a flow index of 110 g/10 minutes, the hydrotalcite type material obtained above and an antioxidant (IRGANOX 1010) were mixed in a weight ratio of 80:20:0.2 and melt kneaded and extruded at approximately 240 degrees C. by a twin-screw extruder into pellets having a diameter of approximately 3 mm and a length of approximately 4 mm. 20 Grams of the pellets were put in 300 milliliters of an aqueous solution of 6 g of a blue dye, Nylosan Blue N-GFL, and heated at approximately 90 degrees C. for 1 hour to be dyed, and washed with water.

Treatment for Improving Color Fastness 0.6 Gram of polymeric polyoxyalkylene carboxylic acid (Malialim AKM0531, ex Nippon Oils & Fats) was dissolved in 50 milliliters of water and neutralized with sodium hydroxide, and added to 50 grams of the dyed polypropylene pellets in 500 milliliters of water and maintained under stirring at approximately 90 degrees C. for 20 minutes. Then, 20 milliliters of calcium acetate of a concentration of 0.5 mol/l were added and maintained for approximately 5 minutes, followed by filtration, washing with water and drying. The dyeability and color fastness were determined as described above. The results are as shown in Table 1.

Comparative Example 1

The procedures of Example 1 were repeated except that 173 g of lauric acid of first grade chemical (95 wt % purity) was used instead of the linear alkylbenzenesulfonic acid.

The obtained powder was subjected to X ray diffraction. Diffractions attributable to hydrotalcite only were observed. The X ray diffraction pattern had no strongest diffraction peak for hydrotalcite of $NO_3$ type nor $CO_3$ type. The strongest diffraction peak was at approximately 24.1 Angstroms, which corresponds to a thickness of a unit layer of the hydrotalcite. The chemical composition was as follows.

$$Mg_{0.68}Al_{0.32}(OH)_2(C_{11}H_{23}COO)_{0.32}\cdot 0.4H_2O$$

Heat stability determined by the thermal analysis is as shown in Table 1.

This material had a specific BET surface area of 15 m$^2$/g; an average secondary particle diameter of 0.50 micron meter; and a maximum secondary particle diameter of 0.96 micron meter.

The dyeability and the color fastness are as shown in Table 1.

Comparative Example 2

The procedures of Example 1 were repeated except that 149 g of m-aminobenzenesulfonic acid was used instead of the linear alkylbenzenesulfonic acid. Diffractions attributable to hydrotalcite only were observed. Except a small diffraction peak of approximately 8.9 Angstroms distributable to hydrotalcite of $NO_3$ type, the X ray diffraction pattern was of hydrotalcite with m-aminobenzenesulfonic acid ions as intercalating ions, having a thickness of a unit layer of approximately 13.5 Angstroms. The chemical composition was as follows.

$$Mg_{0.68}Al_{0.32}(OH)_2(NH_2C_6H_4SO_3)_{0.31}(NO_3)_{0.1}\cdot 0.4H_2O$$

The heat stability, the dyeability and the color fastness are as shown in Table 1.

Comparative Example 3

Neat polypropylene pellets were subjected to the dyeability test and the color fastness test.

TABLE 1

| | Heat Resistance, % | Dyeability, absorbance | Color fastness, ppm | |
|---|---|---|---|---|
| | | | Deionized water | Tetrachloroethylene |
| Example 1 | 3.1 | 2.7 | 0 | 0.4 |
| Com. Ex. 1 | 15.5 | 1.8 | 3.3 | 5.6 |
| Com. Ex. 2 | 1.0 | 1.4 | 5.1 | 9.8 |
| Com. Ex. 3 | — | 0 | — | — |

The invention claimed is:

1. Dyeable resin composition, comprising a resin, and a hydrotalcite material in an amount of 0.1 to 30 parts relative to 100 parts of the resin, wherein the hydrotalcite material is represented by formula (1):

$$(M^{2+})_{1-x}(M^{3+})_x(OH)_2(A^-)_x \cdot mH_2O \qquad (1)$$

wherein $M^{2+}$ is at least one species of divalent metal ions, $M^{3+}$ is at least one species of trivalent metal ions, A– is at least one species of alkylbenzenesulfonic acid ions with the alkyl group having at least 8 carbon atoms, x is the number satisfying the inequality: 0<x<0.5, and m is the number satisfying the equality: 0<=m<5.

2. The dyeable resin composition according to claim 1, wherein $M^{2+}$ is $Mg^{2+}$ and/or $Zn^{2+}$, and $M^{3+}$ is $Al^{3+}$.

3. The dyeable resin composition according to claim 1, wherein A– is at least one species of alkylbenzenesulfonic acid ions with the alkyl group having 8 to 14 carbon atoms.

4. The dyeable resin composition according to claim 1, wherein a thickness of a unit layer of the hydrotalcite material is at least 25 Angstroms.

5. The dyeable resin composition according to claim 1, wherein the resin is polypropylene or polyethylene.

6. The dyable resin composition according to claim 1, wherein the resin is polyurethane.

7. The dyeable resin composition according to claim 1, wherein the resin composition is in a form of fiber.

8. Method of improving color fastness of a dyed resin composition obtained by dyeing the dyeable resin composition according to claim 1 with an anionic dye, wherein the dyed resin composition is surface treated with a solution of at least one polymeric polyanion selected from the group consisting of polyphosphoric acid, carboxymethyl cellulose, alginic acid, polycarboxylic acid, partial alkyl esters of polycarboxylic acid, and β-naphthalensulfonic acid-formalin condensates, and alkali metal salts and ammonium salts of these acids, optionally followed by treatment with a solution of polyvalent metal ions.

9. The method according to claim 8, wherein the resin composition is in a form of fiber.

* * * * *